(12) United States Patent
Rettore et al.

(10) Patent No.: US 7,258,227 B2
(45) Date of Patent: Aug. 21, 2007

(54) DRIVE FOR CONVEYOR BELTS

(75) Inventors: Michele Rettore, San Giorgio delle Pertiche (IT); Gianni Tomasello, Villa del Conte (IT); Mirco Malaman, Piazzola sul Brenta (IT)

(73) Assignee: Alit S.r.l., Campo San Martino (IT)

( * ) Notice: Subject to any disclaimer, the term of this patent is extended or adjusted under 35 U.S.C. 154(b) by 0 days.

(21) Appl. No.: 11/154,702

(22) Filed: Jun. 17, 2005

(65) Prior Publication Data

US 2005/0284734 A1    Dec. 29, 2005

(30) Foreign Application Priority Data

Jun. 24, 2004   (IT)   ............ PD2004A0163

(51) Int. Cl.
*B65G 23/16*   (2006.01)
*B65G 21/18*   (2006.01)

(52) U.S. Cl. .............. 198/833; 198/814; 198/778

(58) Field of Classification Search ............ 198/834, 198/833, 814, 778
See application file for complete search history.

(56) References Cited

U.S. PATENT DOCUMENTS

| | | | |
|---|---|---|---|
| 2,918,020 A * | 12/1959 | Henderson et al. ...... 104/172.5 |
| 3,033,353 A * | 5/1962 | Burnett et al. ............. 198/833 |
| 3,365,051 A * | 1/1968 | Mullis et al. ............... 198/833 |
| 3,381,799 A * | 5/1968 | Havelka ..................... 198/823 |
| 3,387,697 A * | 6/1968 | Harrison .................... 198/687 |
| 3,677,388 A * | 7/1972 | Boltrek et al. ............. 198/833 |
| 4,363,399 A * | 12/1982 | Ludwig et al. ............ 198/833 |
| 4,850,475 A | 7/1989 | Lupo et al. |
| 4,852,720 A * | 8/1989 | Roinestad ................... 198/778 |
| 6,530,468 B2 * | 3/2003 | Fischer-Jensen et al. ... 198/833 |
| 6,766,898 B2 * | 7/2004 | Lessard et al. ............ 198/792 |

FOREIGN PATENT DOCUMENTS

| | | |
|---|---|---|
| DE | 38 14 147 A1 | 11/1989 |
| EP | 0 614 831 A | 9/1994 |
| EP | 0 832 828 A | 4/1998 |

* cited by examiner

*Primary Examiner*—Mark A. Deuble
(74) *Attorney, Agent, or Firm*—Modiano & Associati; Albert Josif; Daniel O'Byrne

(57) ABSTRACT

A drive for conveyor belts, of the type that comprises, associated with a travel frame for a conveyor belt with at least one transport chain, transport elements for the belt and a device for recovering any elongation of the belt. The belt elongation recovery device is constituted by a supporting element for the transport element, which floats adjacent to the belt and is coupled to a box-like body for containing the drive by way of at least one sliding guide and by way of an elastic tension-preventing member for the belt.

14 Claims, 7 Drawing Sheets

DRIVE FOR CONVEYOR BELTS

BACKGROUND OF THE INVENTION

Currently known conveyor belts, particularly the ones used in the food industry, are generally constituted by two or more parallel chains, which are connected transversely by rod-like elements.

The ends of said rod-like elements are fixed to the corresponding and mutually opposite links of said chains.

Transport means, suitable to move the chains of the conveyor belt in a chosen travel direction, and means for recovering any elongation of said belt are associated with said chain-type conveyor belts and are rigidly coupled to a travel frame for the belt.

The transport means are generally constituted by motorized gears, the teeth of which engage the links of the adjacent chains.

The means for recovering the elongation of the belt start to operate when the belt slows down or accelerates in one of its parts, tensioning the adjacent belt portions.

The belt, which generally has a certain elasticity, is elongated by being thus stressed, and can also elongate due to any unevenness in the pitch of the gears or links, due to temperature variations, due to intervening wear of the chains or gears, and other similar drawbacks.

Excessive elongation, however, can cause the belt to break or cause a plastic deformation that makes it defective and unusable.

Excessive tension of the belt, further, can displace the products being conveyed from the correct conveyance position, with the risk of compromising the subsequent operations of the process (such as for example packing, cartoning and the like) to which said products are subjected.

In currently known conveyor belts, the frame supports the transport means on a straight portion and the belt elongation recovery means in the curved regions that are typical for example of spiral belts.

These known elongation recovery means are constituted by curved guides having an elastically variable radius.

The tension of the belt causes the internal part of the elastic curve, stressed by said belt, to shorten its radius, thus discharging the tensions that are accumulating on the belt.

These elastic curves have a relatively complicated structure that is expensive to provide.

Said elastic curves in fact must be custom-designed for each conveyor belt supporting frame, and as such they must be manufactured in small-batches, with consequent substantial production costs.

SUMMARY OF THE INVENTION

The aim of the present invention is to provide a drive for conveyor belts that solves the drawbacks and problems of known transport means and known elongation recovery means.

Within this aim, an object of the present invention is to provide a drive that is cheaper, easier to install and more industrializable than known types.

Another object of the present invention is to provide a drive that can be installed easily in known conveyor belts.

Another object of the present invention is to provide a drive that optimizes the motion of the belt, avoiding accumulations of tensions, tearing, plastic deformations and anything else that can lead to malfunctions of said belt.

Another object of the present invention is to provide a drive that can be installed on straight belt portions as well as on the curved portions that are typical of spiral belts.

Another object of the present invention is to provide a drive for conveyor belts that can be manufactured with known systems and technologies.

This aim and these and other objects that will become better apparent hereinafter are achieved by a drive for conveyor belts, of the type that comprises, associated with a travel frame for a conveyor belt with at least one transport chain, transport means for said belt and means for recovering any elongation of said belt, said drive being characterized in that said recovery means are constituted by a supporting element for said transport means, said supporting element floating adjacent to said belt and being coupled to a box-like body for containing said drive by way of at least one sliding guide and by way of elastic belt tension-preventing means.

BRIEF DESCRIPTION OF THE DRAWINGS

Further characteristics and advantages of the invention will become better apparent from the description of seven preferred but not exclusive embodiments thereof, illustrated by way of non-limiting example in the accompanying drawings, wherein.

DESCRIPTION OF THE PREFERRED EMBODIMENTS

Figure 1:
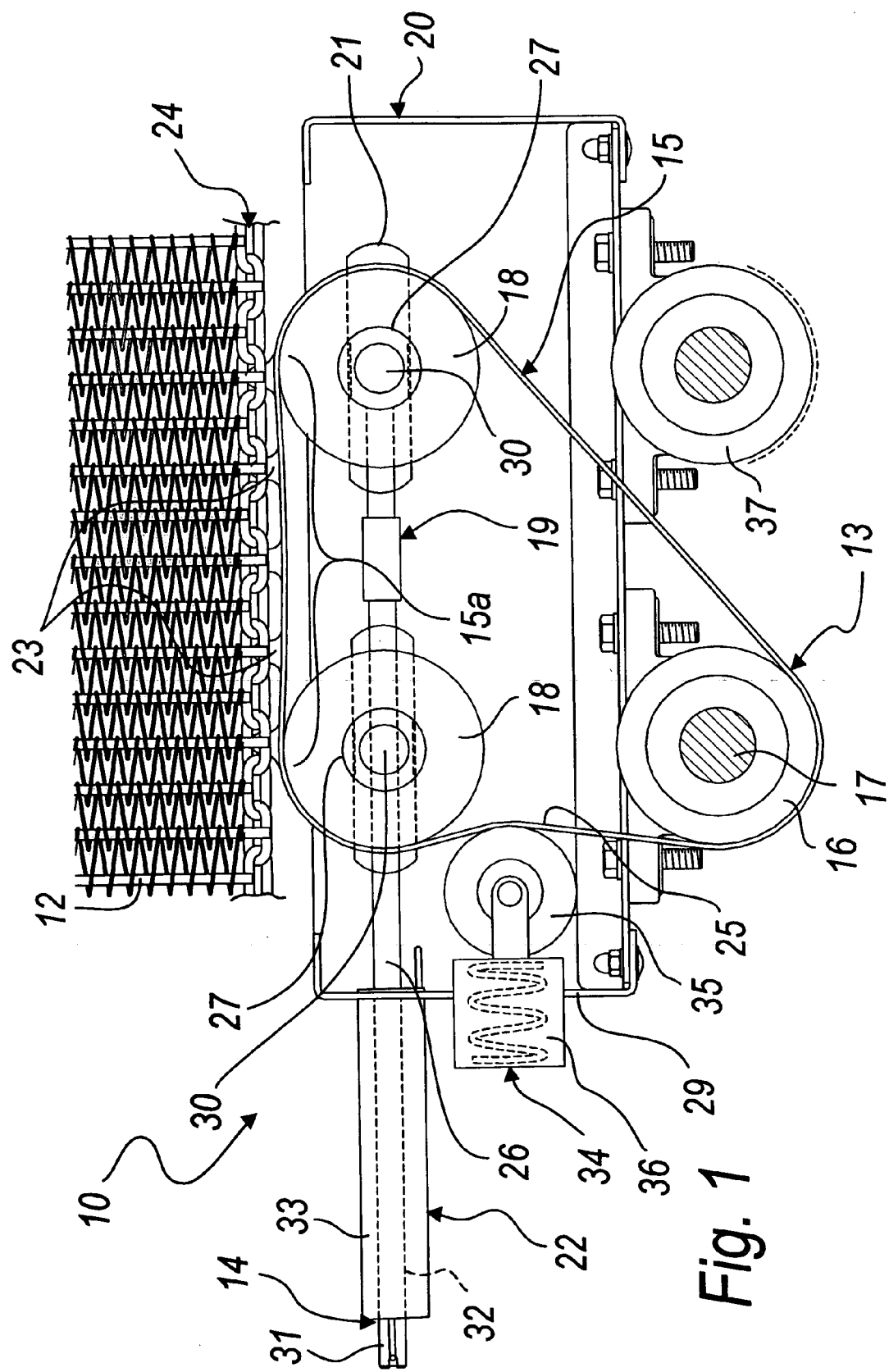
FIG. 1 is a top view of a drive according to the invention according to a first embodiment thereof.
Figure 2:
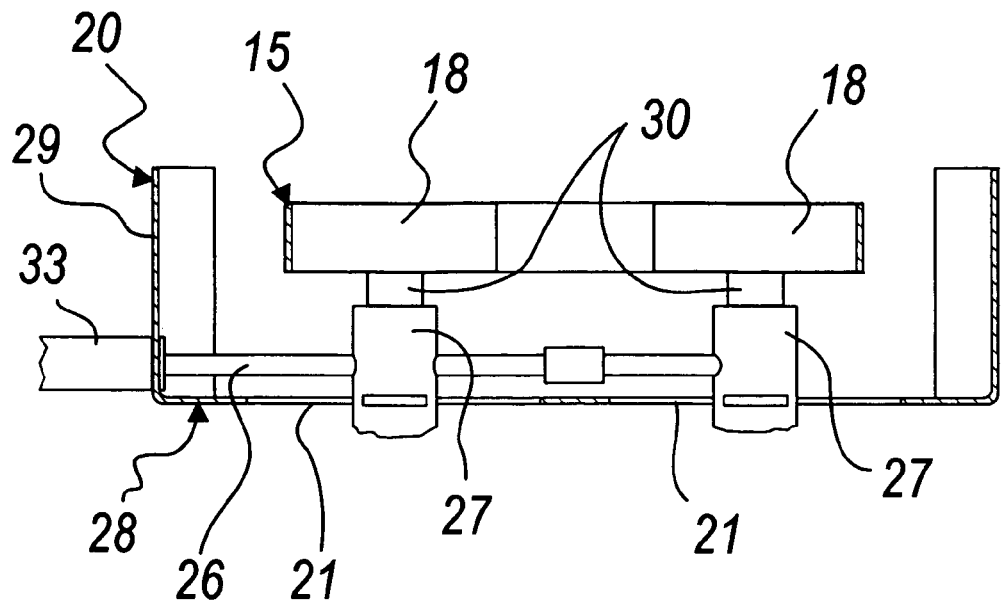
FIG. 2 is a sectional side view of a drive according to the invention.

With reference to the figures, a drive for conveyor belts according to the invention is generally designated in FIGS. 1 and 2 by the reference numeral 10, in a first embodiment thereof.

The drive 10 comprises, coupled to a frame 11 for the travel of a conveyor belt 12 with two transport chains 24, transport means 13 for the belt 12 and elongation recovery means 14 for recovering any elongation of the belt 12.

The transport means 13 are constituted by a flexible transmission element 15, which is arranged around a first driving pulley 16 and two driven pulleys 18.

The first driving pulley 16 is rigidly coupled to a shaft 17, which is associated with the frame 11.

The shaft 17 in turn is turned by an electric motor, which is not shown for the sake of simplicity.

Figure 3:
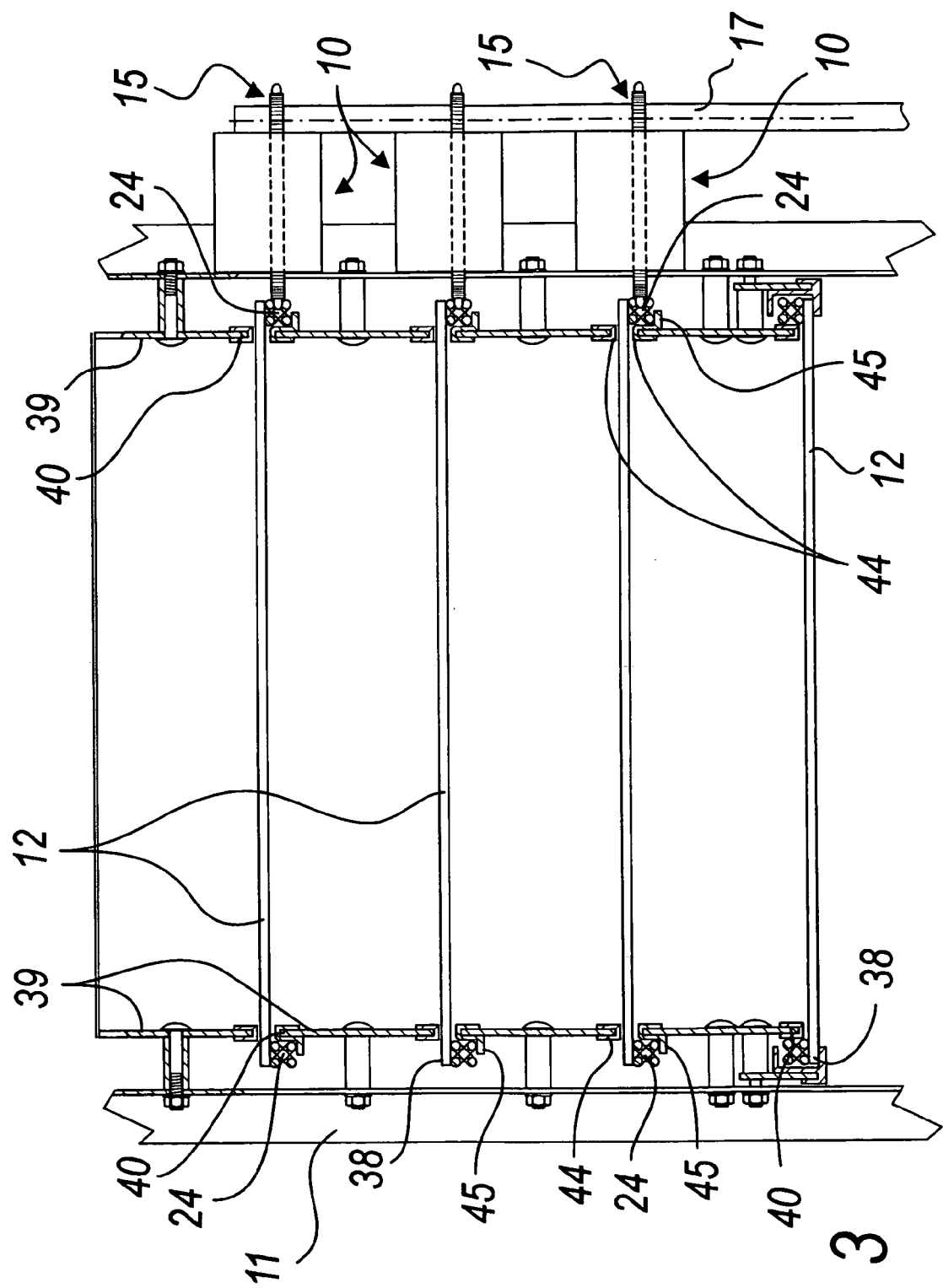
FIG. 3 is a transverse sectional view of a spiral conveyor belt to which a drive according to the invention can be applied according to the first embodiment of FIG. 1.

The belt 12, which follows a spiral path, is arranged on a plurality of levels 38, as shown by the cross-section of FIG. 3.

At each level 38 it is possible to provide a drive 10 according to the invention.

In this case, the drives 10 of each level 38 are arranged so that the driving pulleys 16 are mutually coaxial, so that a single shaft 17 conveniently turns the driving pulleys 16.

The two driven pulleys 18 are pivoted, with parallel axes, on a supporting element 19, which is arranged so as to float parallel and adjacent to the belt 12.

The means 14 for recovering any elongation of the belt 12 are constituted by the floating supporting element 19.

The supporting element 19 is rigidly coupled to a box-like body 20 for containing the drive 10 by way of two sliding guides 21 and by way of tension-preventing elastic means 22, which are suitable to prevent the tension of the belt 12.

The flexible transmission element 15 is provided with transport tabs 23, which are suitable to engage reversibly in the links of the corresponding chain 24.

It should be noted that the figures illustrate, for the sake of simplicity, only part of the tabs 23, which must be understood as being distributed over the entire length of the flexible transmission element 15.

In the first embodiment of a drive 10 according to the invention described here, the flexible transmission element 15 is constituted by a belt 25.

In a constructive variation of the invention, which is not shown, the flexible transmission element 15 is a chain.

The portion 15a of the flexible transmission element 15 comprised between the two driven pulleys 18 is suitable to engage, by means of its traction tabs 23, the facing adjacent chain 24 of the belt 12 and move it.

The floating supporting element 19 is constituted by a bar 26, which is substantially parallel to the belt 12 and is provided with two sliders 27, each of which can slide in one of the two sliding guides 21.

A free end 31 of the bar 26 is rigidly coupled, by way of the tension-preventing elastic means 22, to a wall 29 of the box-like body 20.

The two sliding guides 21 open onto the bottom 28 of the box-like body 20.

A pivot 30 for the rotation of one of the driven pulleys 18 protrudes from each one of the two sliders 27.

The tension-preventing elastic means 22 of the belt 12 are constituted by a traction spring 33.

The traction spring 33 surrounds coaxially a trailing end 32 of the bar 26 that protrudes from the wall 29 and is fixed at one end to the free end 31 of the bar 26 and locked to the wall 29 at the other end.

Tension recovery means 34 for the flexible transmission element 15 are fixed to the box-like body 20.

The tension recovery means 34 are constituted by an idle pulley 35, which is rigidly coupled to the box-like body 20 by way of elastic pusher means 36 and is arranged so as to push against the flexible transmission element 15.

The drive 10, in the embodiment described above, comprises a second driving pulley 37, which is not engaged with the flexible transmission element 15 and is arranged laterally adjacent to the first driving pulley 16.

Figure 4:
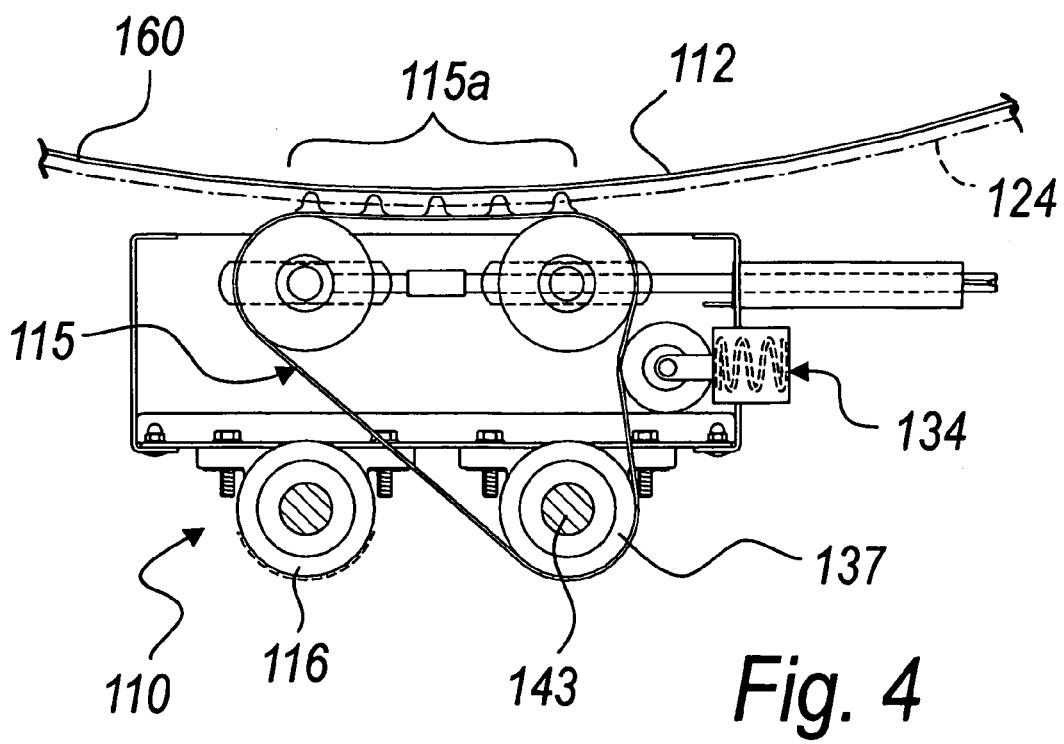
FIG. 4 is a top view of a drive according to the invention in a second embodiment.

FIG. 4 illustrates a second embodiment of a drive 110 according to the invention.

In this second embodiment, the second driving pulley 137, which is driven by a second motor shaft 143, is engaged with the flexible transmission element 115 and transmits motion in the opposite direction with respect to the first driving pulley 116.

The frame 11 has, between two successive levels 38 of the belt 12, containment walls 39 for containing products conveyed by the belt 12 and for air streams for treating said products (not shown).

The containment walls 39 are useful not only to prevent the conveyed products from falling off the belt 12 but also to avoid dispersions of the streams of forced cold or hot air that are blown onto the products being conveyed during the production processes for freezing, generic cooling, pasteurization and the like.

The sides 40 of the walls 39 that are adjacent to the belt 12 have respective shims 44 for the sliding of the belt 12.

A sliding protrusion 45 for the transport chain 24 is rigidly coupled to the shim 44.

The belt 12 is provided symmetrically with a traction chain 24 at both of its edges.

Figure 5:
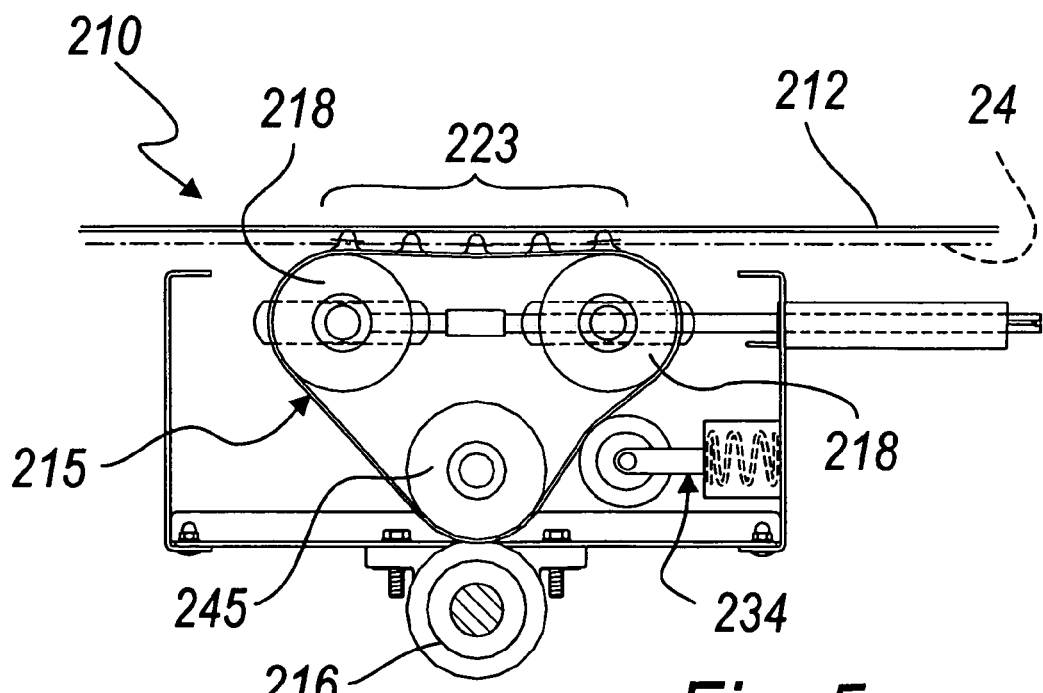
FIG. 5 is a top view of a drive according to the invention in a third embodiment.

FIG. 5 illustrates a third embodiment of a drive for conveyor belts according to the invention, designated by the reference numeral 210.

In said third embodiment there is a single driving pulley 216, i.e., the first one.

The flexible transmission element 215 surrounds the two driven pulleys 218 and a third idle pulley 245.

The first driving pulley 216 moves the flexible transmission element 215 by engaging externally the transport tabs 223 thereof.

The flexible transmission element 215 thus slides between the third idle pulley 245 and the first driving pulley 216.

Figure 6:
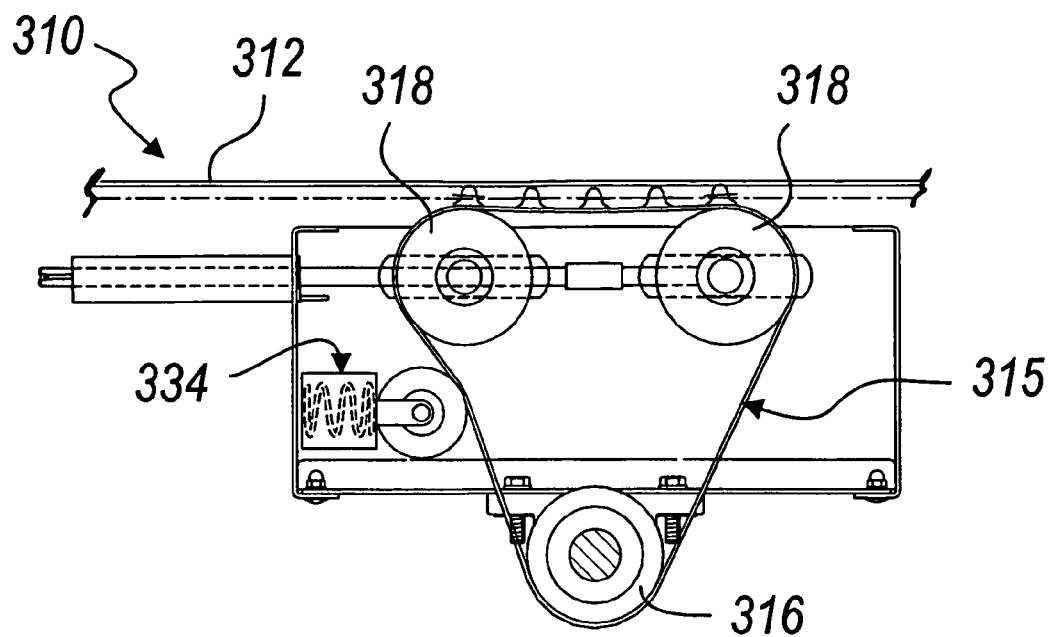
FIG. 6 is a top view of a drive according to the invention in a fourth embodiment.

A fourth embodiment of a drive according to the invention is designated by the reference numeral 310 in FIG. 6.

FIGS. 5 and 6 exemplify the possibility to provide a drive according to the invention that is motorized by means of a single shaft 17, which drives the belt 212 and 312 in both directions, so as to reduce the manufacturing cost of the drive 210 and 310.

Said fourth embodiment differs from the preceding ones in that it comprises a single driving pulley 316, with the transmission element 315 arranged so as to surround the two pulleys 318 and the driving pulley 316, which drives it.

All the described embodiments conveniently have tension recovery means, respectively 134, 234 and 334, for the flexible transmission element.

In FIG. 4, the invention, in a second embodiment, is applied to the outer side of a curve 160 of the belt 112, so as to exemplify the versatility of the drive according to the invention, which in all the embodiments described here and in the further equivalent variations not described here can be applied equally to bends of the belt 12, 112, 212 and 312.

Figure 7:
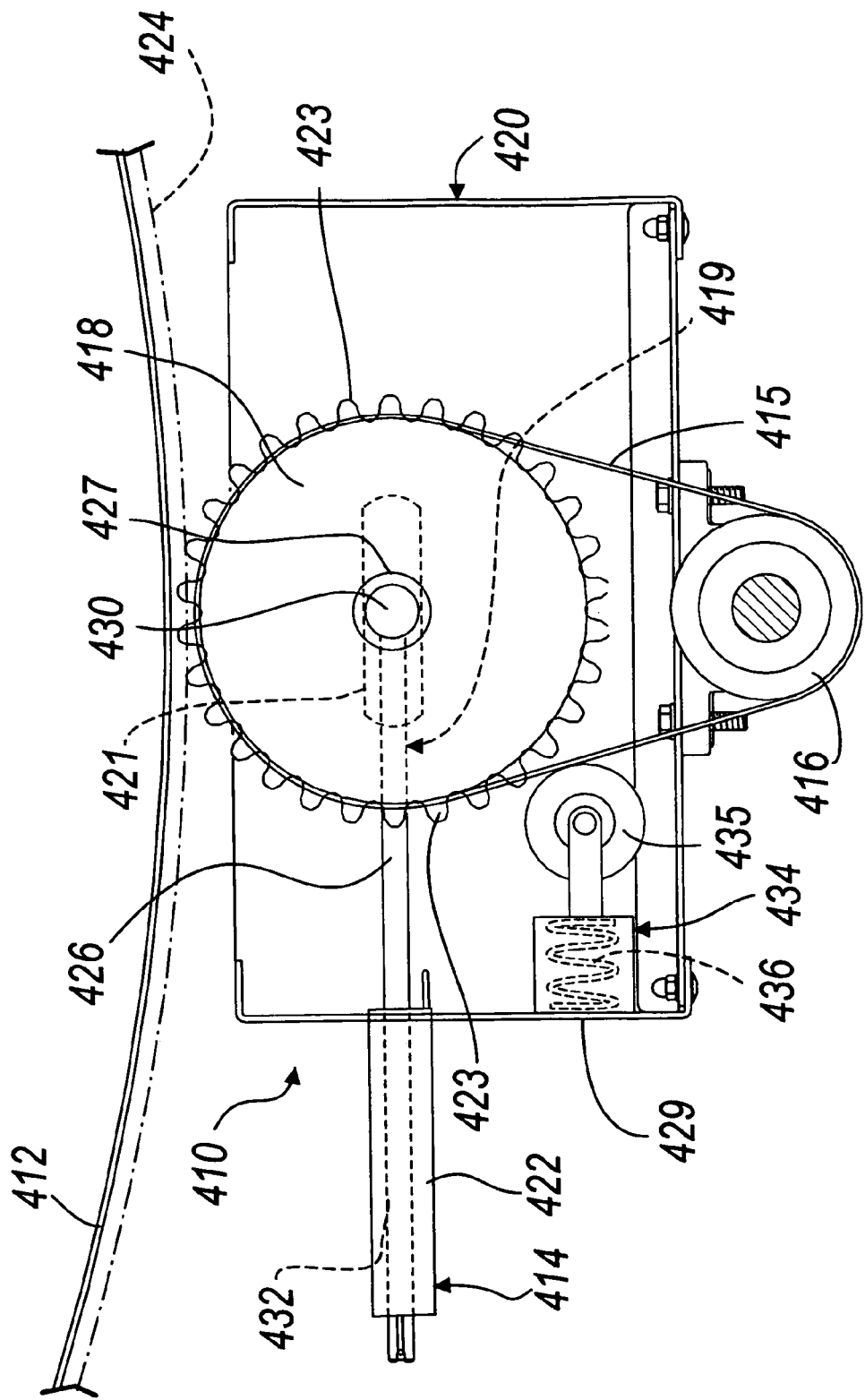
FIG. 7 is a top view of a drive according to the invention in a fifth embodiment.
Figure 8:
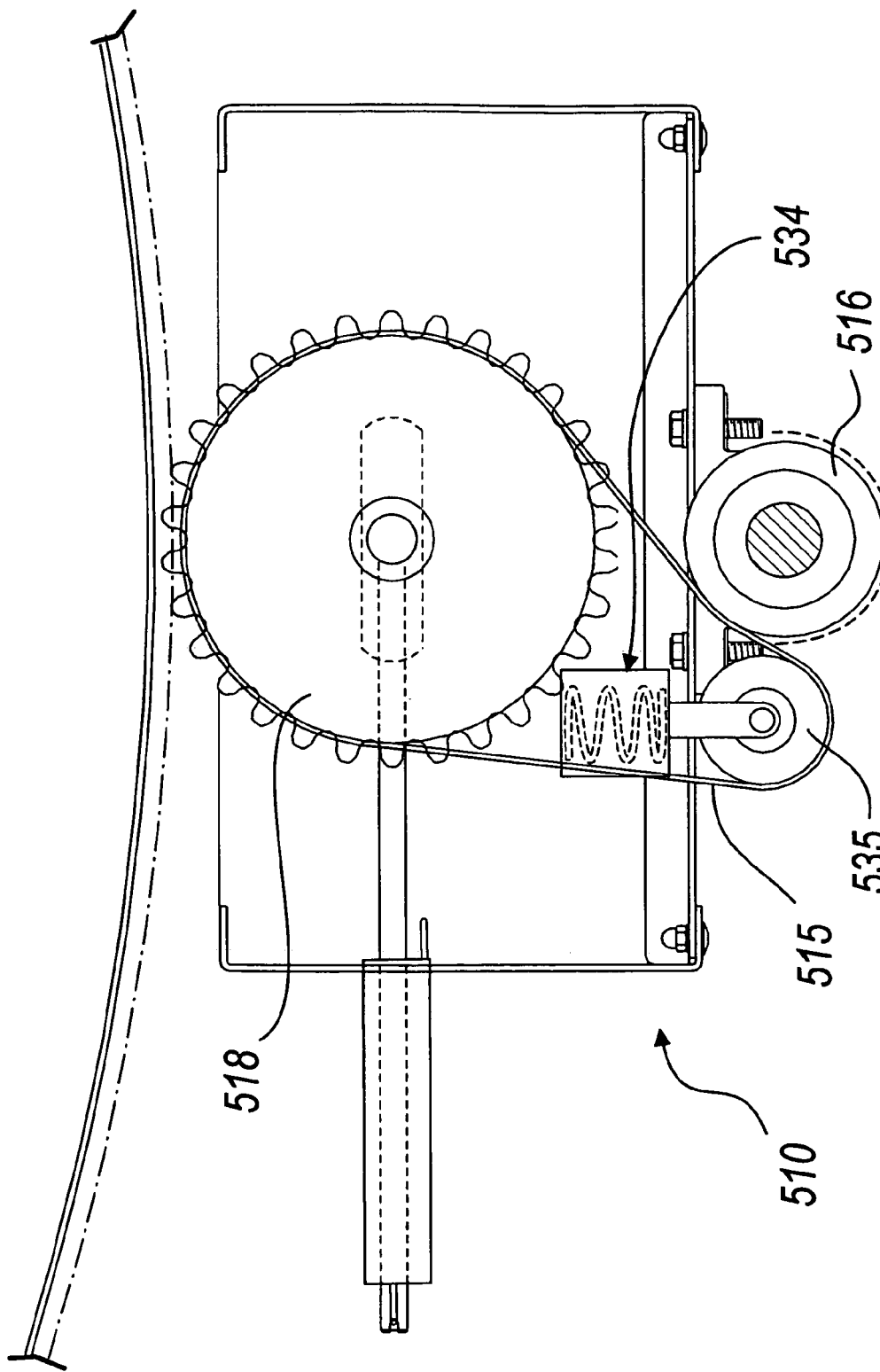
FIG. 8 is a top view of a drive according to the invention in a sixth embodiment.
Figure 9:
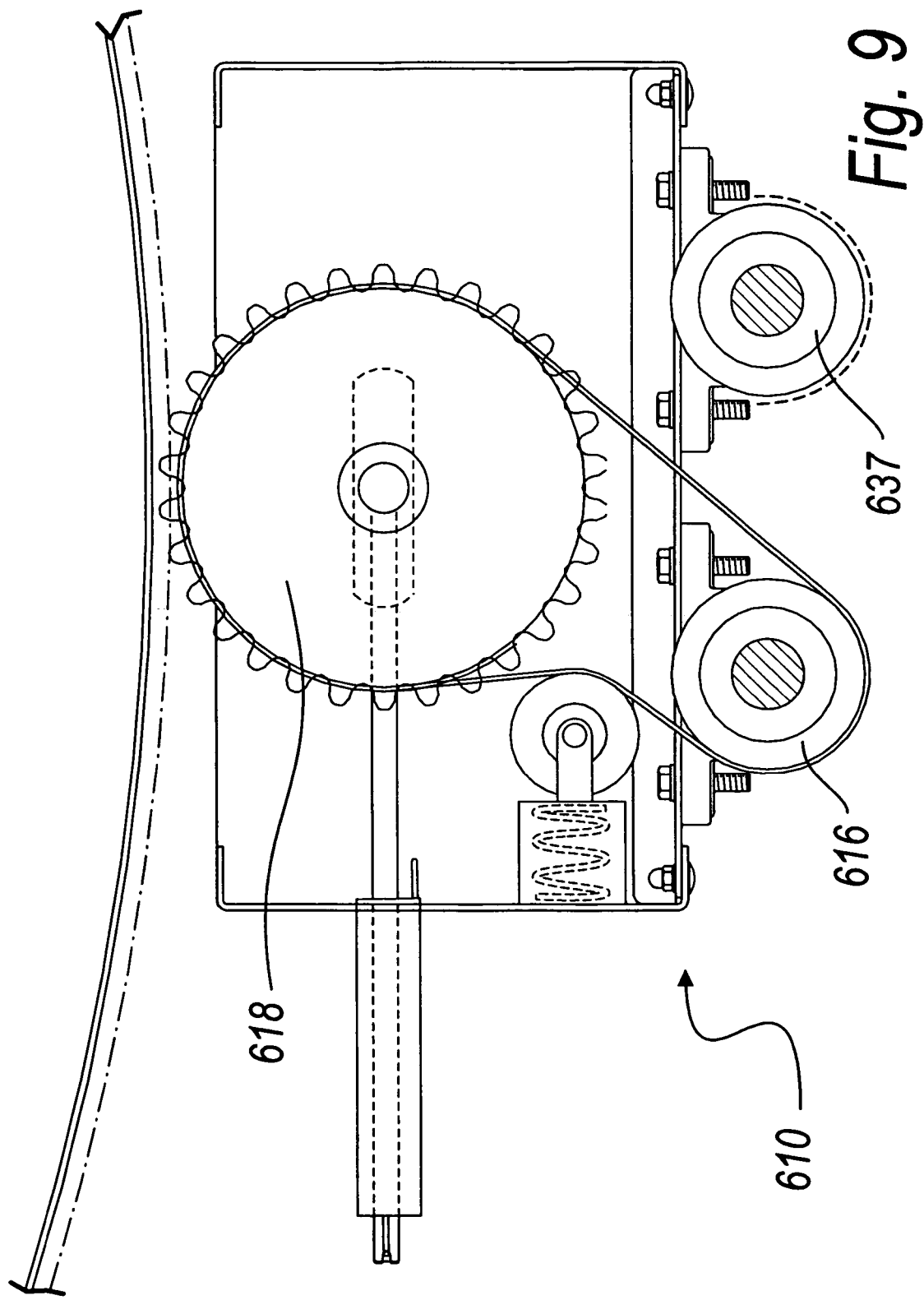
FIG. 9 is a top view of a drive according to the invention in a seventh embodiment.

Three additional embodiments of the invention are shown in FIGS. 7, 8 and 9.

A fifth embodiment of the invention 410, shown in FIG. 7, is provided with a flexible transmission element 415, which is arranged around a driving pulley 416 and a driven pulley 418.

In this embodiment, as in the subsequent ones, the transport tabs 423 protrude from the pulley 418, which is substantially constituted by a sprocket driven by the transmission element 415.

In a manner similar to what has been described in the preceding embodiments, the tabs 423 are suitable to engage the links of the driving chain 424 of the belt 412.

In a manner similar to what has been described in the fourth embodiment, the pulley 418 is pivoted to a supporting element 419, which is arranged so as to float adjacent to the belt 412.

The means 414 for recovering any elongation of the belt 412 are constituted by the floating supporting element 419, which is rigidly coupled to a box-like body 420 for containing the drive 410 by way of a sliding guide 421 and by way of tension-preventing elastic means 422, which are suitable to prevent the tension of the belt 412.

The floating supporting element 419 is constituted by a bar 426, which is provided with a slider 427 that can slide within the guide 421.

A free end of the bar 426 is rigidly coupled by way of the elastic tension-preventing means 422 to a wall 429 of the box-like body 420.

The sliding guide 421 opens onto the bottom of the box-like body 420.

A pivot 430 for the rotation of the pulley 418 protrudes from the slider 427.

The elastic tension-preventing means 422 are constituted by a traction spring.

Said traction spring surrounds coaxially a trailing end 432 of the bar 426 and is fixed at one end to the free end of the bar 426 and locked to the wall 429 at the opposite end.

Tension recovery means 434 for the flexible transmission element 415 are fixed to the box-like body 420.

The tension recovery means 434 are constituted by an idle pulley 435, which is rigidly coupled to the box-like body 420 by way of elastic pusher means 436 and is arranged so as to push against the flexible transmission element 415.

In a sixth embodiment, shown in FIG. 8, in which the drive according to the invention is designated by the reference numeral 510, the pulley 518 is again constituted by a sprocket.

With respect to the fifth embodiment of FIG. 7, the flexible transmission element 515 is arranged around the idle pulley 535 of the tension recovery means 534 and around the driven toothed pulley 518, but is moved in any case by a driving pulley 516.

In the same way as in the third 210 and fourth 310 embodiments, shown in FIGS. 5 and 6, respectively, the device according to the invention, in its fifth 410 and sixth 510 embodiments, as shown schematically in FIGS. 7 and 8, is made so that the belt can be dragged in both directions by using a motorized shaft only.

In a manner similar to the one described for the first embodiment of the invention, a seventh embodiment, shown in FIG. 9 and designated by the reference numeral 610 therein, is provided with a toothed pulley 618, a first driving pulley 616 and a second driving pulley 637, said driving pulleys being suitable to transmit motion in two opposite directions.

The flexible transmission element 615 can be installed selectively around one or the other of the two driving pulleys.

These last three described embodiments, the fifth, sixth and seventh ones, use a conventional toothed pulley (constituted by the sprocket 418, 518, 618), which is already used in known transport means but is actuated by a flexible transmission element (instead of by means of a direct drive, as generally occurs), which allows said toothed pulley to float on the corresponding floating supporting element, for example 419.

The particularly compact structure of a drive 10, 110, 210, 310, 410, 510, 610 according to the invention allows to apply it both to straight portions and to curved portions of the belt 12, 112, 212, 312, 412.

Consider, for example, FIG. 4; the description given for the embodiment of the drive 110 according to the invention described therein also applies to the other embodiments described.

The driving of the belt 112 on the curved region 160 is allowed by the flexible transmission element 115, which indeed because of its flexibility characteristics adapts, with its portion 115a, to the edge 124 of the curve 160 traced by the belt 112, correctly transmitting the motion.

The drive 10, 110, 210, 310, 410, 510 and 610 according to the invention allows to eliminate from the frame 11 for the travel of the belt 12 the elastic curved guides with variable radius, with a great simplification in terms of design and with an important cost reduction.

Further, eliminating the curved guides with variable radius allows great standardization also in the production of the frames.

The drive 10, 110 and onward, by comprising both the transport means and the means for recovering the elongation of the belt, is particularly easy to install, optionally even on frames that are already in use.

In practice it has been found that the invention thus described solves the problems noted in known types of transport means and conveyor belt elongation recovery means.

In particular, the present invention provides a drive for conveyor belts that is cheaper, simpler to install and more industrializable than known types.

Moreover, the present invention provides a drive that can be installed easily in known conveyor belts.

Further, the present invention provides a drive that optimizes the motion of the belt, avoiding accumulations of tensions, tearing, plastic deformation and any other factor that can lead to malfunctions of said belt, both on straight belt portions and on the curved portions that are typical of spiral belts.

Not least, the present invention provides a drive for conveyor belts that can be mass-manufactured with known equipment and technologies.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2004A000163 from which this application claims priority are incorporated herein by reference.

What is claimed is:

1. A drive for a conveyor belt, that travels along a travel frame and is provided with at least one transport chain, comprising: transport means for said belt; elongation recovery means for recovering any elongation of said belt; and a box shaped body for containing the drive, and wherein said elongation recovery means are constituted by a supporting element for said transport means, by at least one sliding guide, and by elastic tension-preventing means for the belt, said supporting element floating adjacent to said belt and being coupled to said box-like body by way of said at least one sliding guide and by way of said elastic tension-preventing means, said transport means comprising a flexible transmission element, a driving pulley rigidly coupled to the frame and engaged with said flexible transmission element, and at least one driven pulley pivoted to said floating supporting element adjacent to said belt, said flexible transmission element being arranged so as to surround said at least one driven pulley, and transport tabs which are reversibly engageable with links of said at least one transport chain, said transport tabs being providable on any of said flexible transport element and said at least one driven pulley, said floating supporting element being constituted by a bar that is substantially parallel to said belt in said at least one slider that is slidable in a direction substantially parallel to said belt in said at least one sliding guide, said at least one slider supporting said at least one driven pulley, a free end of said bar being coupled by way of said elastic tension-preventing means to a wall of said box-shaped body, and said elastic tension-preventing means being constituted by a traction spring, which is fixed, at one end thereof, to said free end of said bar and is arranged so as to surround coaxially a trailing end of the bar that protrudes from said wall out of said box-shaped body, and to be locked to said wall on a side thereof inside said box-shaped body.

2. The drive of claim 1, wherein the belt extends along said frame trough successive levels thereof, said frame having, between two successive said levels, containment walls for containing products conveyed by the belt and for air streams providable for processing said products, and wherein sides of said walls that are adjacent to said belt are provided with respective shims that enable sliding of said belt.

3. The drive of claim 1, wherein said transport tabs, which are engageable reversibly with the links of the at least one transport chain, are provided on said flexible transmission element.

4. The drive of claim 1, wherein said transport tabs, which are engageable reversibly with the links of said at least one transport chain are provided on said at least one driven pulley.

5. The drive of claim 1, wherein said flexible transmission element is a belt.

6. The drive of claim 1, wherein said flexible transmission element is a chain.

7. The drive of claim 1, comprising two driven pulleys.

8. The drive of claim 1, comprising one driven pulley.

9. The drive of claim 7, wherein said flexible transmission element has a portion thereof, comprised between said two driven pulleys, that is adapted to engage, by way of said transport tabs, said at least one transport chain of the belt and to move said belt.

10. The drive of claim 7, comprising two sliding guides, which are provided as openings that open onto a bottom region of said box-shaped body, two said sliders, each of which is engaged slidingly in a respective one of said two guides, a pivot for rotation actuation of said driven pulleys, each of which protrudes from a respective one of said two sliders.

11. The drive of claim 1, further comprising tension recovery means, fixed to said box-shaped body, for said flexible transmission element.

12. The drive of claim 11, wherein said tension recovery means are constituted by elastic pusher means and by at least one idle pulley, which is coupled to said box-shaped body by way of said elastic pusher means and is arranged so as to push against said flexible transmission element.

13. The drive of claim 12, comprising an additional driving pulley arranged laterally with respect to said driving pulley, so as to be free from engagement with said flexible transmission element.

14. The drive of claim 12, comprising an additional driving pulley that is engaged with said flexible transmission element and transmits motion in an opposite direction with respect to said driving pulley.

* * * * *